United States Patent [19]
Maejima

[11] Patent Number: 5,320,206
[45] Date of Patent: Jun. 14, 1994

[54] COIL MOUNTING AND TERMINALS FOR AN ELECTROMAGNETIC CLUTCH

[75] Inventor: Enjiro Maejima, Kiryu, Japan

[73] Assignee: Ogura Corporation, Madison Heights, Mich.

[21] Appl. No.: 56,673

[22] Filed: May 3, 1993

[51] Int. Cl.$^5$ .................. F16D 27/04; H01F 7/20; H01F 15/10
[52] U.S. Cl. .................. 192/84 C; 192/84 A; 335/289; 336/192
[58] Field of Search .................. 192/84 A, 84 C; 335/289, 296, 297; 336/192

[56] References Cited

U.S. PATENT DOCUMENTS

| | | | |
|---|---|---|---|
| 2,729,318 | 1/1956 | Harter | 192/84 C |
| 3,176,198 | 3/1965 | Straub | 335/296 |
| 3,559,784 | 2/1971 | Miller | 192/84 C |
| 3,584,715 | 6/1971 | Miller | 192/84 C X |
| 4,166,265 | 8/1979 | Reynolds et al. | 336/192 |
| 4,432,446 | 2/1984 | Okano et al. | 192/84 C |
| 4,935,713 | 6/1990 | Bekheet | 192/84 C X |
| 5,121,093 | 6/1992 | Matsushita | 192/84 C X |
| 5,132,655 | 7/1992 | Suzuki et al. | 336/192 |
| 5,138,293 | 8/1992 | Ishimaru | 192/84 C X |
| 5,153,550 | 10/1992 | Sugiura et al. | 336/192 |
| 5,227,757 | 7/1993 | Hirota et al. | 336/192 |
| 5,235,305 | 8/1993 | Scheffler | 336/192 |

Primary Examiner—Rodney H. Bonck
Assistant Examiner—Andrea Pitts
Attorney, Agent, or Firm—Reising, Ethington, Barnard, Perry & Milton

[57] ABSTRACT

The electromagnetic clutch (10) includes a rotor assembly (12), an armature assembly (14) and a field assembly (16). The field assembly (16) includes a ring and flange assembly (86). A terminal passage (104) is provided through the base portion (100) of the circular ring 96 with a U-shaped cross-section that form as a toroidal chamber (98). An electromagnetic coil (90) is encased in a bobbin (88) and a cap (92) and inserted into the toroidal chamber with a bobbin terminal post (110) extending into the terminal passage (104). A terminal housing (120) with a terminal sleeve (142) telescopically receives the bobbin terminal post (110) and the terminal sleeve (142) extends into the terminal passage (104). Leads (112 and 114) from the electromagnetic coil (90) extend into the terminal housing (120). Terminals (122) are housed in terminal apertures (136 and 138) in the terminal housing (120) and are in contact with the leads (112 and 114). A terminal cover (124) holds the terminals (122) in place and rotatably and axially fixes the terminal housing (120) relative to the ring 96. The terminal cover (124) is clamped to the ring (96) and held in a fixed position relative to the ring.

9 Claims, 4 Drawing Sheets

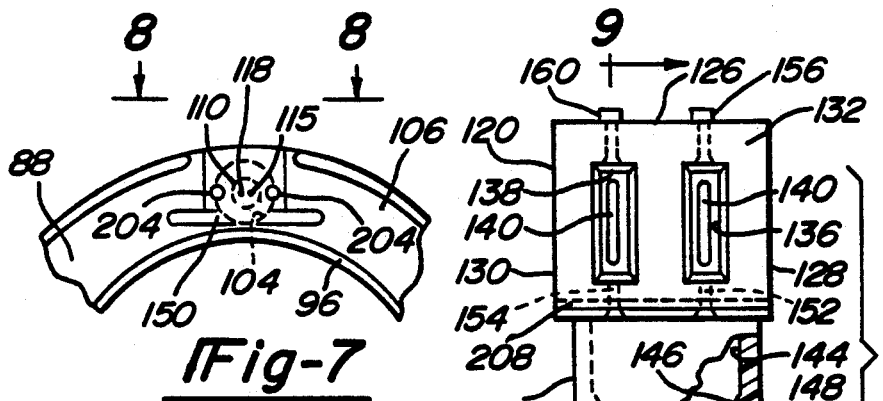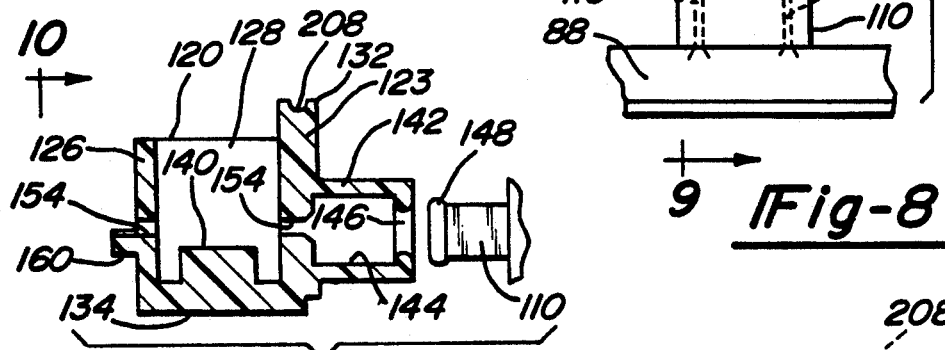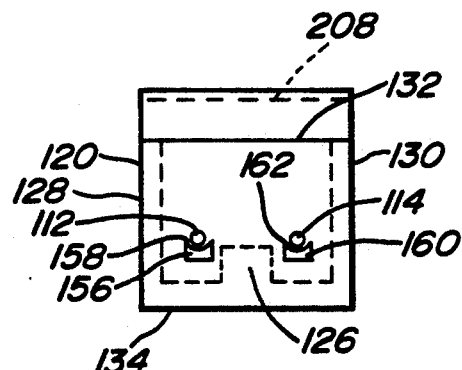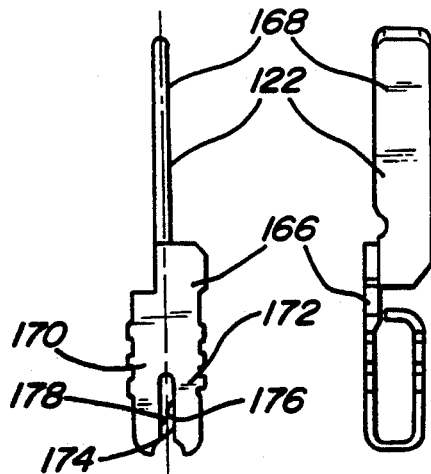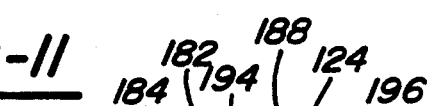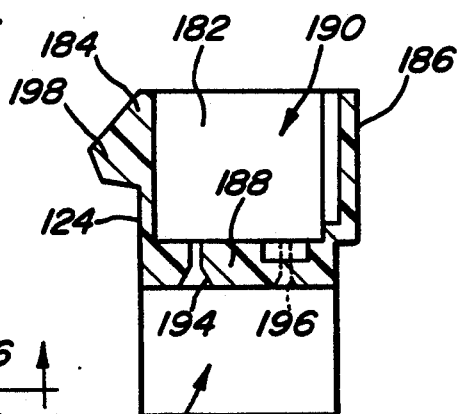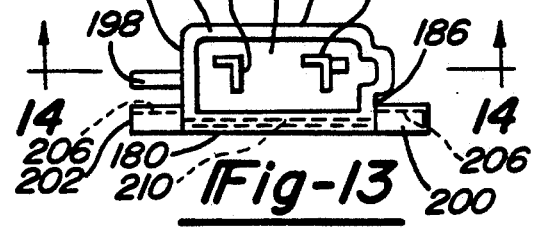

COIL MOUNTING AND TERMINALS FOR AN ELECTROMAGNETIC CLUTCH

TECHNICAL FIELD

This invention is in an electromagnetic clutch, coil and terminal assembly.

BACKGROUND OF THE INVENTION

Electromagnetic clutches are used to drive a variety of mechanical devices including vehicle air conditioning compressors. These clutches are engaged and disengaged as required to drive the compressor when cooling is required and to inactivate the compressor when cooling is not required. To engage an electromagnetic clutch current is supplied to an electromagnetic coil. Current in the coil creates an electromagnetic force which draws an armature and rotor together. Torque is transferred from the rotor through the armature when the clutch is engaged. To disengage the electromagnetic clutch the coil is disconnected from a power source thereby eliminating the electromagnetic force that holds the armature and the rotor in contact with each other.

The electromagnetic clutch includes a rotor assembly, an armature assembly, and a field assembly. The rotor of the assembly is rotatively journaled on a tubular projection on a compressor housing that is concentric with the compressor drive input shaft and a central axis of the compressor. The rotor has an armature contact surface, a torque input member that can be driven by a belt, chain, gear or other torque transfer system, and a toroidal chamber for an electromagnetic coil in the field assembly. The armature is attached to an armature hub that is secured to a compressor drive input shaft. The armature is axially movable along the central axis of the compressor into and out of engagement with the armature contact surface on the rotor. The electromagnetic coil is part of a field assembly. The field assembly includes a ring and flange assembly. The ring portion of the ring and flange assembly has a toroidal chamber with a U-shaped cross-section. A flange is attached to the ring portion of the ring and flange assembly. The flange is attached to the compressor housing with the ring portion projecting into the toroidal chamber in the rotor assembly. An electromagnetic coil is enclosed in a bobbin and cover and pressed into the toroidal chamber in the ring and flange assembly and secured in place. Two lead wires extend from the electromagnetic coil through passages through the ring and flange assembly. The two wire leads that extend from the electromagnetic coil are connected to terminals. The terminals are connected to a power source to energize the electromagnetic coil and create a magnetic force that pulls the armature into contact with the armature contact surface on the rotor to engage the clutch. The terminals are disconnected from a power source to deenergize the electromagnetic coil, allow the armature to move out of contact with the armature contact surface and disengage the clutch.

A number of different terminal assemblies have been connected to the two wire leads that extend from the electromagnetic coil. These terminal assemblies and their connection to the two wire leads are critical. The wire leads from the electromagnetic coil are small and relatively easy to break. The wire leads from the electromagnetic coil are frequently broken when they are merely attached to larger leads with a terminal. Movement of the large lead and terminal bends the wire leads from the electromagnetic coil and eventually breaks the wire lead.

Terminals have been successfully attached to the electromagnetic coils by employing a terminal housing that is integral with the bobbin. A large port is required in the ring and flange assembly for the passage of the terminal housing. The terminal housing frequently extends out of the ring and flange assembly too far making it difficult to secure terminals and a terminal cover to the terminal housing. The terminal housing may also fail to extend out of the ring and flange assembly to a position which will permit the terminals and the terminal cover to be properly aligned with a terminal housing and secured to the ring and flange assembly. If the terminal housing does not pass out of the ring and flange assembly far enough, the terminals and terminal cover cannot be aligned with the terminal housing and attached to the ring and flange assembly properly. Occasionally the terminal cover is secured to the ring and flange assembly in a position which results in a bending load, a shear force or a twisting load being applied to the terminal housing that is integral with the bobbin. These loads can cause the bobbin and terminal housing to break. Improper positioning of the terminal cover and a loose terminal cover can lead to a failure of the connection between the terminals and the leads from the electromagnetic coil.

SUMMARY OF THE INVENTION

An object of the invention is to provide a field assembly for an electromagnetic clutch with a terminal housing that is telescopically received by a terminal post on a bobbin. Another object of the invention is to provide a field assembly for an electromagnetic clutch with a terminal housing that is rotatably received by a terminal post on a bobbin. A further object of the invention is to provide a field assembly for an electromagnetic clutch with a terminal housing that is angularly and axially fixed on a ring and flange assembly by fasteners which secure the terminal housing to the ring and flange assembly.

The field assembly includes an electromagnetic coil with two leads. A bobbin with a circular channel and a terminal post extending axially from the base of the channel covers one end of the electromagnetic coil with the two leads extending through the terminal post and with an end of the electromagnetic coil positioned in the channel. A cover covers the other end of the electromagnetic coil. The bobbin, electromagnetic coil and cover are secured inside the toroidal chamber in the ring and flange assembly with the terminal post extending into a terminal passage through the ring and flange assembly. A terminal housing telescopically receives the terminal post and the two leads from the electromagnetic coil. A surface of the terminal housing contacts the ring and flange assembly to set the axial position of the terminal housing relative to the terminal post. Two terminals are mounted in the terminal housing. One of the terminals is in engagement with one of the leads from the electromagnetic coil and the other terminal is in engagement with the other lead from the electromagnetic coil. A terminal cover, with terminal passages that receive the terminals engages the terminal housing and fixes the terminal housing in a desired angular position relative to the terminal post on the bobbin. The terminal housing is clamped to the ring and flange assembly to hold the terminal housing in a fixed position relative to the terminal post.

The foregoing and other object, features and advantages of the present invention will become apparent in the light of the following detailed description of exemplary embodiments thereof, as illustrated in the accompanying drawings.

BRIEF DESCRIPTION OF THE DRAWINGS

FIG. 7 is a rear view of the field assembly with a terminal cover, terminals and terminal housing removed;

FIG. 8 is an enlarged top view of the terminal housing;

FIG. 9 is a sectional view of the terminal housing taken along line 9—9 in FIG. 8;

FIG. 10 is a sectional view of the terminal housing taken along line 10—10 in FIG. 9;

FIG. 11 is a front view of a terminal;

FIG. 12 is a side view of a terminal;

FIG. 13 is a top view of the terminal cover;

FIG. 14 is a sectional view of the terminal cover taken along line 14—14 in FIG. 13.

DESCRIPTION OF THE PREFERRED EMBODIMENT

Figure 1:
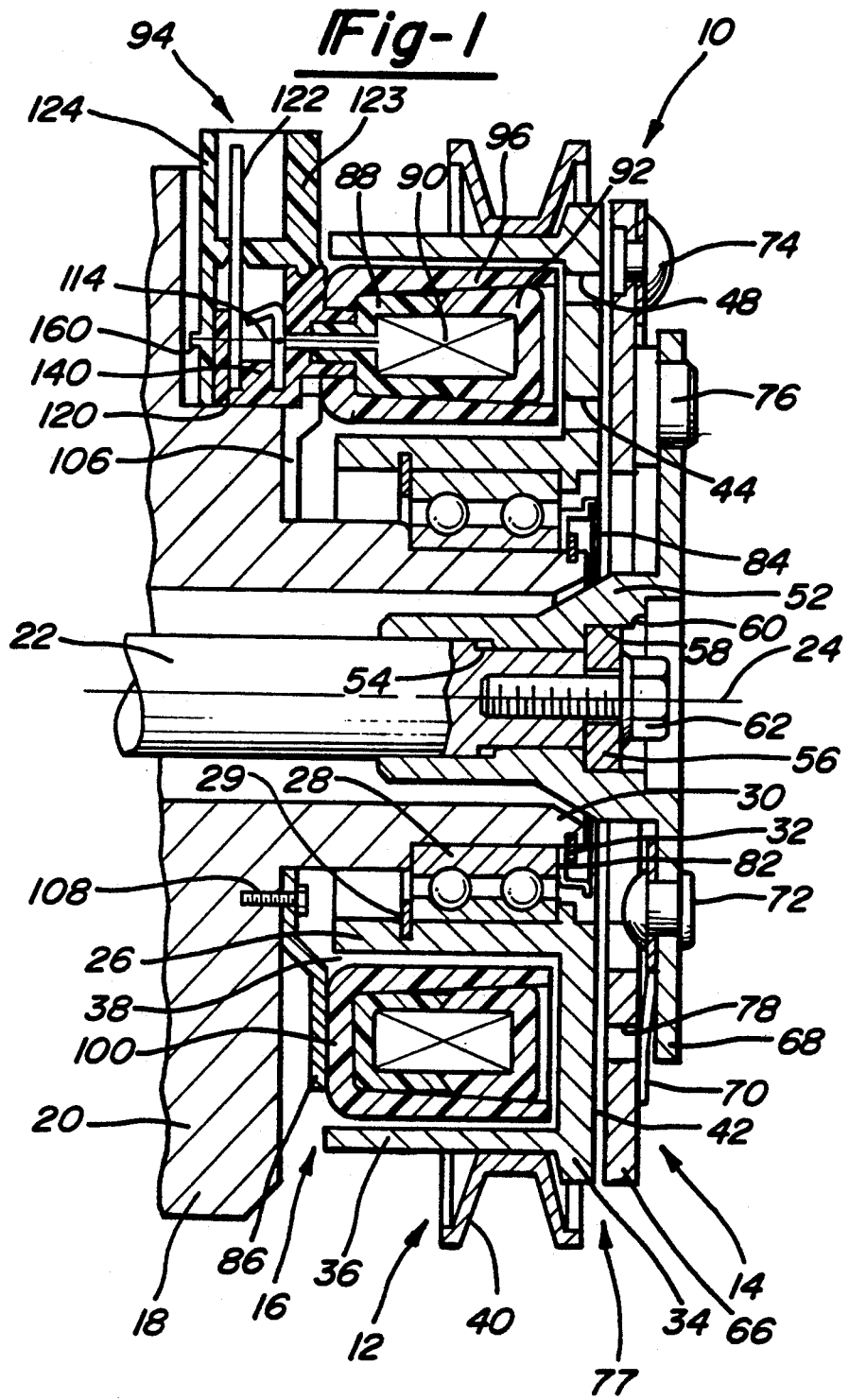
FIG. 1 is a sectional view of an electromagnetic clutch and a portion of an air conditioning compressor.

The electromagnetic clutch 10 includes a rotor assembly 12, an armature assembly 14 and a field assembly 16. As shown in FIG. 1, the electromagnetic clutch 10 is used for driving an air conditioning compressor 18 with a housing 20 and a driven input shaft 22 with a central axis 24. The electromagnetic clutch 10 is, however, capable of driving many different mechanical devices. Torque can be transmitted between a shaft and a belt drive, a chain drive, a gear drive or another shaft drive.

The rotor assembly 12 includes a tubular inner hub portion 26 which is pressed onto the outer race of a double ball race bearing 28 and is locked in position by snap ring 29. The inner race of the double ball race bearing 28 is pressed on to a tubular projection 30 of the housing 20 that is concentric with central axis 24. A snap ring 32 axially fixes the double ball race bearing 28 on the tubular projection 30. A radially extending flange 34 extends outwardly from the forward end of the tubular inner hub portion 26. An outer tubular portion 36 of the rotor assembly 12 is concentric with central axis 24 and has its forward end attached to the radially extending flange 34. The outer tubular portion 36, the radially extending flange 34 and the tubular inner hub portion 26 define a toroidal chamber 38 within the rotor assembly 12 with an open rear side. A V-belt drive pulley 40 is secured to the outer surface of the outer tubular portion 36 of the rotor assembly 12 A V-belt transmits torque to the V-belt drive pulley 40 to drive the rotor assembly 12.

Figure 3:
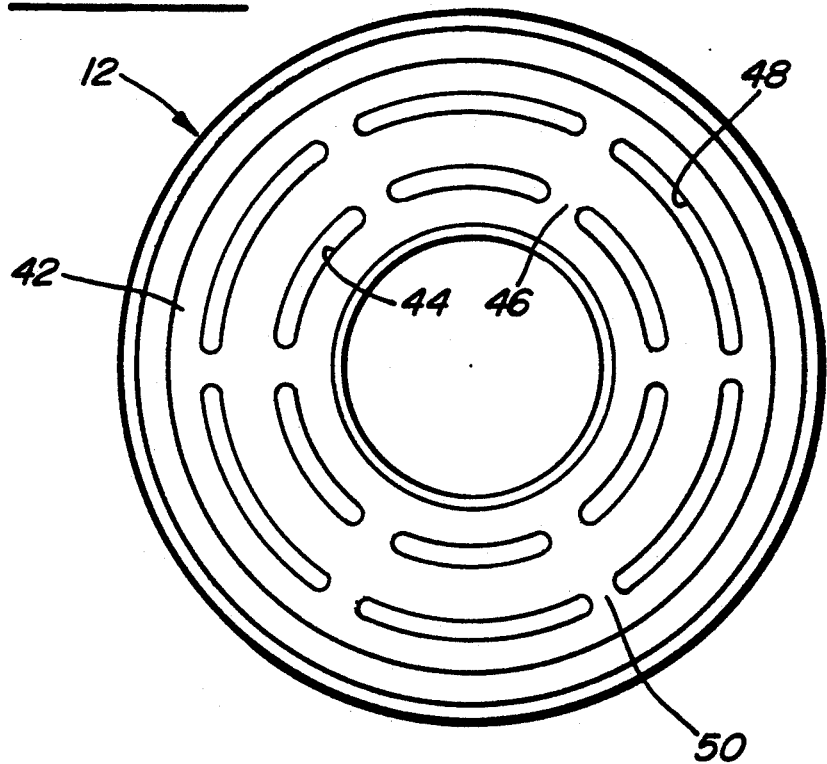
FIG. 3 is an elevational view of the armature contact surface on the rotor in an axial direction.
Figure 4:
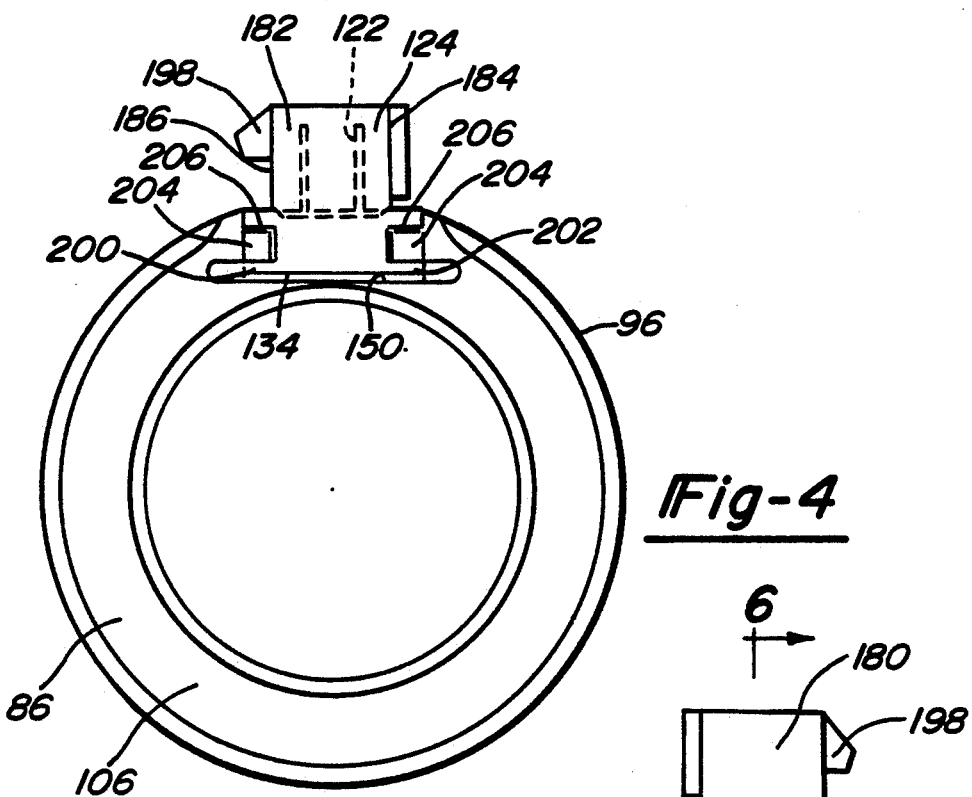
FIG. 4 is a rear view of the field assembly.
Figure 5:
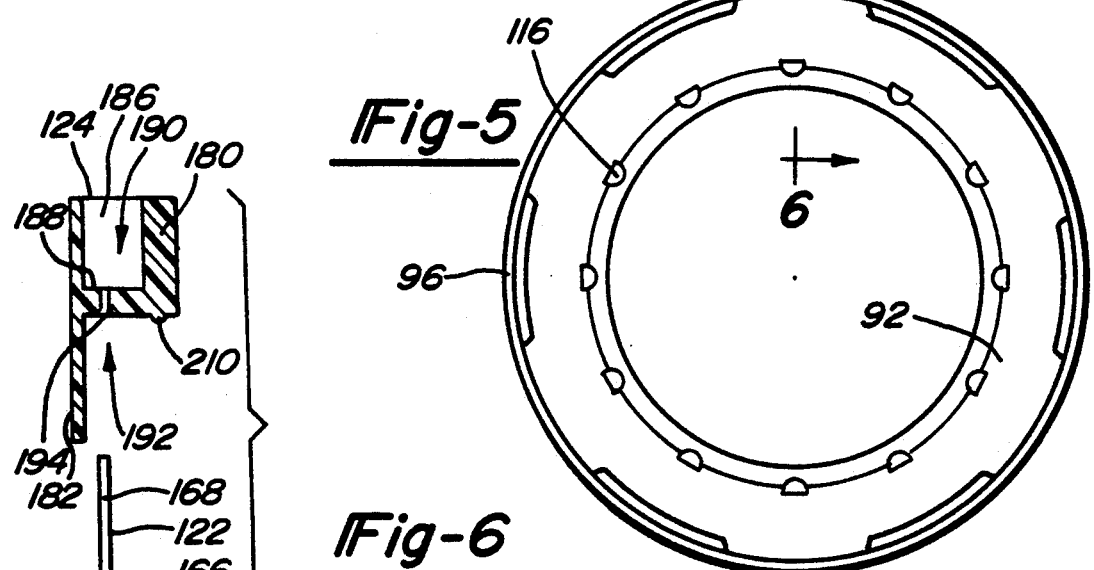
FIG. 5 is a front view of the field assembly.
Figure 6:
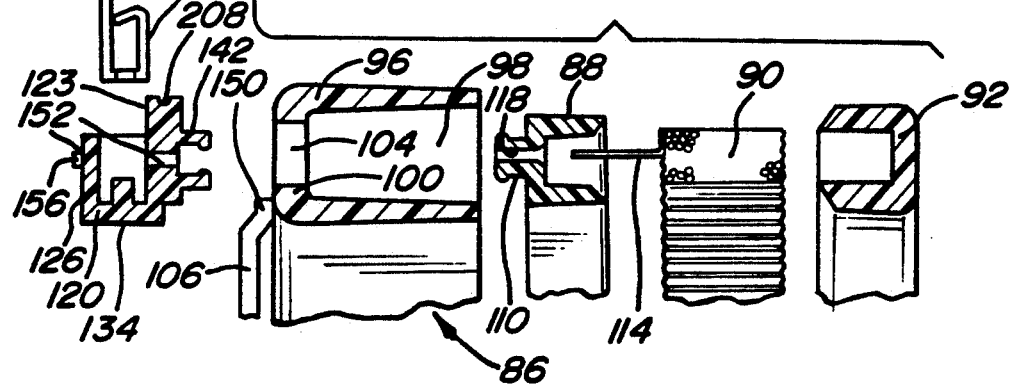
FIG. 6 is an expanded cross-sectional view of the field assembly taken along line 6—6 in FIG. 5.

An armature contact surface 42 is provided on the front surface of the radially extending flange 34 of the rotor assembly 12. The armature contact surface 42, as shown, is in a flat plane that is perpendicular to the central axis 24. The radially extending flange 34, as shown in FIG. 3, has an inner series of six banana slots 44. These banana slots 44 have a common center line that is a circle concentric with the central axis 24. The inner series of six banana slots 44 are separated from each other by bridges 46 with sides that are arcuate and provide arcuate end walls for the banana slots. The radially extending flange 34 also has an outer series of six banana slots 48. The outer series of banana slots 48 have a common center line that is a circle concentric with the central axis 24. The banana slots 48 in the outer series of banana slots are separate from each other by bridges 50 having arcuate sides. The arcuate sides of the bridges 50 provide arcuate end walls for the banana slots 48.

Figure 2:
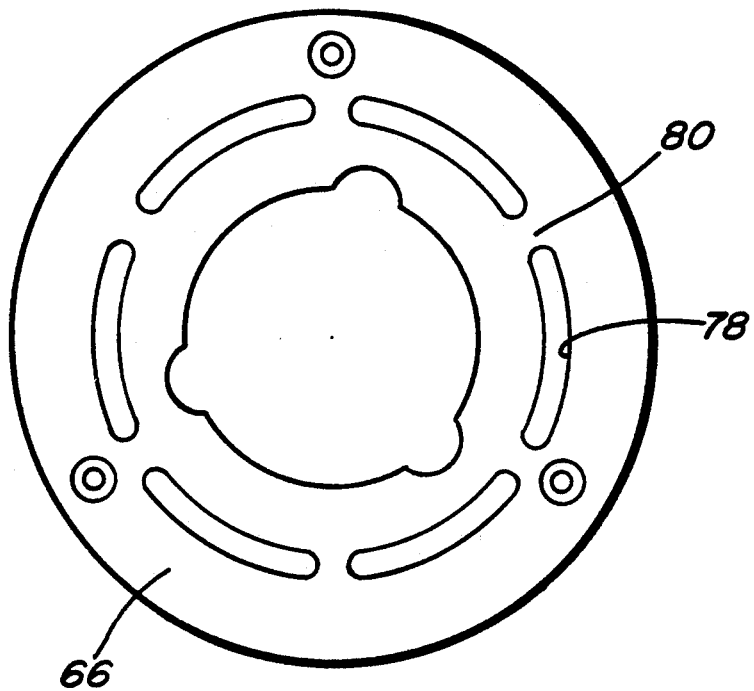
FIG. 2 is an elevational view of the armature in an axial direction.

The armature assembly 14 includes an armature hub 52 with a splined bore 54 that receives a splined end of the driven input shaft 22 of the compressor 18. A washer 56 is placed in a bore 58 in the armature hub 52 and is secured by staking as shown at 60. The washer 56 contacts the end of the driven input shaft 22 to axially position the armature hub 52. A bolt 62 passes through a bore in the washer 56 and screws into a threaded bore in the driven input shaft 22 to retain the armature hub 52 on the driven input shaft. An armature 66 is attached to the stop flange 68 on the armature hub 52 by leaf springs 70. The leaf springs 70 are attached to the stop flange 68 by rivets 72 and to the armature 66 by rivets 74. The leaf springs 70 hold the armature 66 against rubber bumpers 76 on the stop flange 68 when the electromagnetic clutch 10 is disengaged. The leaf springs 70 are deflected and allow the armature 66 to move axially into contact with the armature contact surface 42 on the rotor assembly 12 when the electromagnetic clutch 10 is engaged. The space between the armature 66 and the armature contact surface 42 when the electromagnetic clutch 10 is disengaged is the air gap 77. A proper air gap 77 is important for proper engagement and disengagement of the electromagnetic clutch 10. The armature 66 as shown in FIG. 2 has six banana slots 78 with center lines on a circle that is concentric with the central axis 24. The banana slots 78 are separated by bridges 80 with arcuate sides. The arcuate sides form curved ends for the banana slots 78. The banana slots 78 are radially half way between the inner series of banana slots 44 and the outer series of banana slots 48 in the radially extending flange 34 of the rotor assembly 12.

A seal 82 is secured between the inner race of the double ball race bearing 28 and the snap ring 32. The seal 82 includes a flexible disk 84 with a central aperture that surrounds and contacts the armature hub 52 to prevent lubricant that escapes from the housing 20, from lubricating the armature contact surface 42 and the armature 66.

The field assembly 16 includes a ring and flange assembly 86, a bobbin 88, an electromagnetic coil 90, a cap 92 and a terminal assembly 94. The ring and flange assembly 86 is a circular ring 96 with a U-shaped cross-section and defines a toroidal chamber 98. The base portion 100 of the U-shaped cross-section is a rear wall of the toroidal chamber 98. The front wall of the toroidal chamber 98 is open. A terminal passage 104 is provided in the base portion 100 of the ring 96. A flange 106 is attached to the ring 96. The flange 106 is also connected to the housing 20 by bolts 108 and supports the toroidal chamber 98 in the ring 96 inside the toroidal chamber 38 in the rotor assembly 12. The flange 106 must be formed and designed to be rigidly secured to the housing of the particular air conditioning compressor 18 that is to be driven by the electromagnetic clutch 10. The circular ring 96 is concentric with the central axis 24 and substantially fills the toroidal chamber 38 in the rotor assembly 12 without contacting the rotor assembly.

The bobbin 88 is a circular member with a channel-shaped cross-section and a bobbin terminal post 110. The bobbin terminal post 110 extends axially to the rear of the base portion of the channel-shaped cross-section. The bobbin 88 receives the rear portion of the electromagnetic coil 90. The cap 92 is a ring with a channel-shaped cross-section. The cap 92 is positioned over the front portion of the electromagnetic coil 90 and cooperates with the bobbin 88 to substantially encase the entire electromagnetic coil. The bobbin 88, electromagnetic coil 90, and cap 92 are inserted into the toroidal chamber 98 in the ring 96 of the ring and flange assembly 86. The bobbin terminal post 110 extending into the terminal passage 104 through the base portion 100 of the ring 96. The bobbin terminal post 110 may extend all the way through the terminal passage 104. If the base portion 100 is relatively thick, the bobbin terminal post 110 could extend only part way through the terminal passage 104. The leads 112 and 114 from the electromagnetic coil 90 extend out of the toroidal chamber 98 through the passages 115 and 118 through the bobbin terminal post 110.

The bobbin 88, electromagnetic coil 90 and the cap 92 are forced into the toroidal chamber 98 in ring 96 by a press during assembly. The toroidal chamber 98 decreases in size from the open front end to the base portion 100 so that the bobbin 88 and cap 92 are wedged toward the electromagnetic coil 90 and hold the electromagnetic coil in a fixed position relative to the ring and flange assembly 86. The bobbin 88, electromagnetic coil 90 and the cap 92 are secured in the toroidal chamber 98 by staking as shown at 116. Staking occurs while the bobbin, electromagnetic coil and the cap are held by a press and cannot move relative to the ring and flange assembly 86. The distance which the bobbin terminal post 110 extends into or through the terminal passage 104 can vary from one field assembly 16 to another because the position of the bobbin within the toroidal chamber 102 is dependent upon the wedging force on the radially inner and outer portions of the bobbin, cap and electromagnetic coil.

The terminal assembly 94 includes a terminal housing 120, a pair of terminals 122 and a terminal cover 124. The terminal housing 120 is a block member with a front wall 123, a rear wall 126, a left side wall 128, a right side wall 130, a top wall 132 and a bottom wall 134. Two terminal apertures 136 and 138 are provided in the top wall 132 of the terminal housing 120. The terminal apertures 136 and 138 are generally rectangular and extend from the top wall 132 down toward the bottom wall 134. A wire support post 140 extends upwardly from the bottom of each terminal aperture 136 and 138 and is in the center of each terminal aperture.

The terminal sleeve 142 extends forwardly from the front wall 123 of the terminal housing 120. The terminal sleeve 142 has a bore 144 which telescopically receives the bobbin terminal post 110. The bore 144 has sufficient depth to accommodate variations in the length of bobbin terminal posts 110 and the thickness of the base portion 100 of rings 96. The entrance to the bore 144 includes a circular collar 146 with an inside diameter that is smaller than the outside diameter of the terminal post collar 148 on the rear portion of the bobbin terminal post 110. The circular collar 146 and the terminal post collar 148 provide an interference fit between the terminal housing 120 and the bobbin terminal post 110. During assembly the terminal housing snaps onto the bobbin terminal post 110 and is held on the terminal post by the interference fit between the circular collar 146 and the terminal post collar 148. The terminal sleeve 142 moves into the terminal passage 104 in the ring 96 until the front wall 12 of the terminal housing 120 contacts the rear surface of the base portion 100 of the ring 96 of the ring and flange assembly 86. An edge portion 150 of the flange 106 that is formed by a cut out for the terminal housing 120 limits rotation of the terminal housing about the bobbin terminal post 110.

Passages 152 and 154 are provided through the terminal housing 120 for the wire leads 112 and 114 from the electromagnetic coil 90. The passage 152 for the wire lead 112 starts inside the terminal sleeve 142, enters the terminal aperture 136 slightly above the wire support post 140 and continues through the rear wall 126 of the terminal housing 120. A wire support 156 with an arcuate surface 158 extends from the rear wall 126 of the terminal housing 120 at the bottom of the passage 152. The passage 154 for the wire lead 114 starts inside the terminal sleeve 142, enters the terminal aperture 138 slightly above the wire support post 140 and continues through the rear wall 126 of the terminal housing 120. A wire support 160 with an arcuate upper surface 162 extends from the rear wall 126 of the terminal housing 120 at the bottom of the passage 154.

The terminals 122 for the wire leads 112 and 114 are made from bent sheet metal. The terminals 122 have a lower portion 166 for engaging the wire leads 112 or 114 and an upper blade portion 168. The lower portions 166 are shaped to surround a post 140 and anchor the terminal 122 in the terminal aperture 136 or 138. Tangs 170 and 172 engage the sides of the terminal apertures 136 or 138 to hold the terminal 122 in one of the terminal apertures 136 or 138. A slot 174 in the lower portion of the terminal 122 is open at the bottom and receives a wire lead 112 or 114 that is supported by the post 140 during insertion of the terminal into a terminal aperture 136 or 138. Edges 176 and 178 of the slot 174 cut through insulation on the leads 112 or 114 of the electromagnetic coil 90 to form a low resistance electrical connection as the terminal 122 is forced into a terminal aperture 136 or 138.

A terminal cover 124 has a front wall 180, a rear wall 182, a right side wall 184, and a left side wall 186. A generally horizontal partition 188 divides the terminal cover 124 into an upper chamber 190 and a lower chamber 192. The generally horizontal partition 188 has two terminal blade passages 194 and 196. The terminal cover 124 is slid down over the terminals 122 and the terminal housing 120 during assembly. The blade portions 168 of both terminals 122 pass up through the terminal blade passages 194 and 196 in the horizontal partition 188 and into the upper chamber 190. The upper chamber 190 forms a receptacle for a female terminal. A locking flange 198 is provided on the left side wall 186 of the terminal cover 124 for locking a female terminal in the upper chamber 190.

The lower chamber 192 of the terminal cover 124 receives the terminal housing 120. The lower chamber 192 does not have a front wall. The lower chamber 192 therefore engages the top wall 132, the rear wall 126, the left side wall 128 and the right side wall 130 of the terminal housing 120 to axially and rotatably fix the terminal housing relative to the ring and flange assembly 86. The front wall 123 of the terminal housing 120 is held in contact with the ring 96 of the ring and flange assembly 86 and the terminal sleeve 142 is in the terminal passage 104 through the ring. Flanges 200 and 202 extend from the side walls 184 and 186 and are in contact with the ring 96 of the ring and flange assembly 86. Tabs 204 on the flange 106 are pressed into recesses 206 in the flanges 200 and 202 to positively anchor the terminal cover 124 after the terminal cover has been positioned by the terminal housing 120 A groove 208 can be provided in the top wall 132 of the terminal housing 120 to receive a projection 210 on the terminal cover 124 and further lock the terminal cover 124 and the terminal housing 120 to each other.

The telescopic connection between the terminal housing 120 and bobbin terminal post 110 ensures that there is automatic accommodation of the axial position of the bobbin 42 relative to the terminal housing 120. The telescopic connection also ensures that there are no axial loads or forces between the terminal housing 120 and the bobbin 42 The bobbin terminal post 110 is rotatable in the terminal sleeve 142 on the terminal housing 120. The freedom to rotate the terminal sleeve 142 relative to the bobbin terminal post 110 ensures that no torque loads or forces are exerted on the bobbin terminal post 110 by the terminal housing 120. Shear loads on bobbins 88 have generally not been a problem. However, inserting the terminal sleeve 142 on the terminal housing 120 into the terminal passage 104 limits shear forces between the bobbin 88 and the terminal housing 120. The wire leads 112 and 114 from the electromagnetic coil 90 are completely enclosed in the bobbin 88 and the terminal housing 120. The bobbin 88 and the terminal housing are nonconductors and are in a fixed position relative to each other. Completely enclosing the leads 112 and 114 in the bobbin 88 and the terminal housing 120 substantially reduces the possibility of breaking the wire leads.

The preferred embodiment of the invention has been described in detail but is an example only and the invention is not restricted thereto. It will be easily understood by those skilled in the art that modifications and variations can easily be made within the scope of the invention.

I claim:

1. An electromagnetic clutch including a rotor rotatably supported by a bearing for rotation about a central axis, a torque transmission drive on the rotor, a toroidal chamber inside the rotor that is concentric with the central axis, and an armature contact surface on the rotor; an armature assembly including an armature hub rotatable about the central axis, an armature attached to the armature hub and supported by the armature hub adjacent to the armature contact surface on the rotor by supports that permit axial movement of the armature relative to the armature hub; and a field assembly with an electromagnetic coil supported inside the toroidal chamber inside the rotor that includes a flange, a ring with a toroidal chamber that has a U-shaped cross-section defined by a base that is generally perpendicular to the central axis, a radially outer tubular portion that extends axially from the base and is concentric with the central axis, a radially inner tubular portion that extends axially from the base and is concentric with the central axis and the radially outer tubular portion, a terminal passage through the base of the ring, a bobbin with a terminal post mounted in the toroidal chamber formed by the ring adjacent to the base with the terminal post extending into the terminal passage through the base, an electromagnetic coil with a portion in contact with the bobbin and having two leads that extend out of the toroidal chamber formed by the ring through the bobbin terminal post, a cap that covers a portion of the electromagnetic coil and closes the toroidal chamber formed in the ring, fasteners that fasten the bobbin, electromagnetic coil and cap in the toroidal chamber formed by the ring, a terminal housing with passages that receive the two leads from the electromagnetic coil and engages the bobbin terminal post, a first terminal mounted in the terminal housing and in engagement with one of the two leads from the electromagnetic coil, a second terminal mounted in the terminal housing and in engagement with the other lead from the electromagnetic coil, a terminal cover which telescopically receives the first and second terminals to retain the terminal in the terminal housing, and fasteners which connect the terminal cover to the ring and fix the terminal housing relative to the electromagnetic coil.

2. An electromagnetic clutch as set forth in claim 1 wherein the terminal housing telescopically receives the bobbin terminal post.

3. An electromagnetic clutch as set forth in claim 2 wherein the terminal housing has a terminal sleeve which telescopically receives the bobbin terminal post and which extends into the terminal passage through the base of the ring.

4. An electromagnetic clutch as set forth in claim 3 wherein the terminal sleeve has an internal bore that telescopically receives the bobbin terminal post and wherein at least a portion of the bobbin terminal post is larger in diameter than a portion of the bore in the terminal sleeve and creates an interference fit.

5. An electromagnetic clutch as set forth in claim 1 wherein the terminal cover is fastened to the base of the ring.

6. An electromagnetic clutch as set forth in claim 1 wherein the terminal cover engages at least two sides of the terminal housing to axially and angularly fix the terminal housing relative to the bobbin terminal post.

7. An electromagnetic clutch as set forth in claim 6 wherein the terminal housing has a plurality of surfaces and wherein the terminal cover engages surfaces on the terminal housing to axially and angularly fix the terminal housing relative to the bobbin terminal post.

8. An electromagnetic clutch as set forth in claim 7 wherein the terminal housing includes a terminal sleeve with a bore which telescopically receives the bobbin terminal post and wherein the terminal sleeve extends into the terminal passage in the ring.

9. An electromagnetic clutch as set forth in claim 1 wherein the terminal cover includes a chamber that receives the terminal housing.

* * * * *